March 2, 1926.
A. E. MAYNARD
LENS CUTTER
Filed Oct. 28, 1919
1,574,989
4 Sheets-Sheet 2
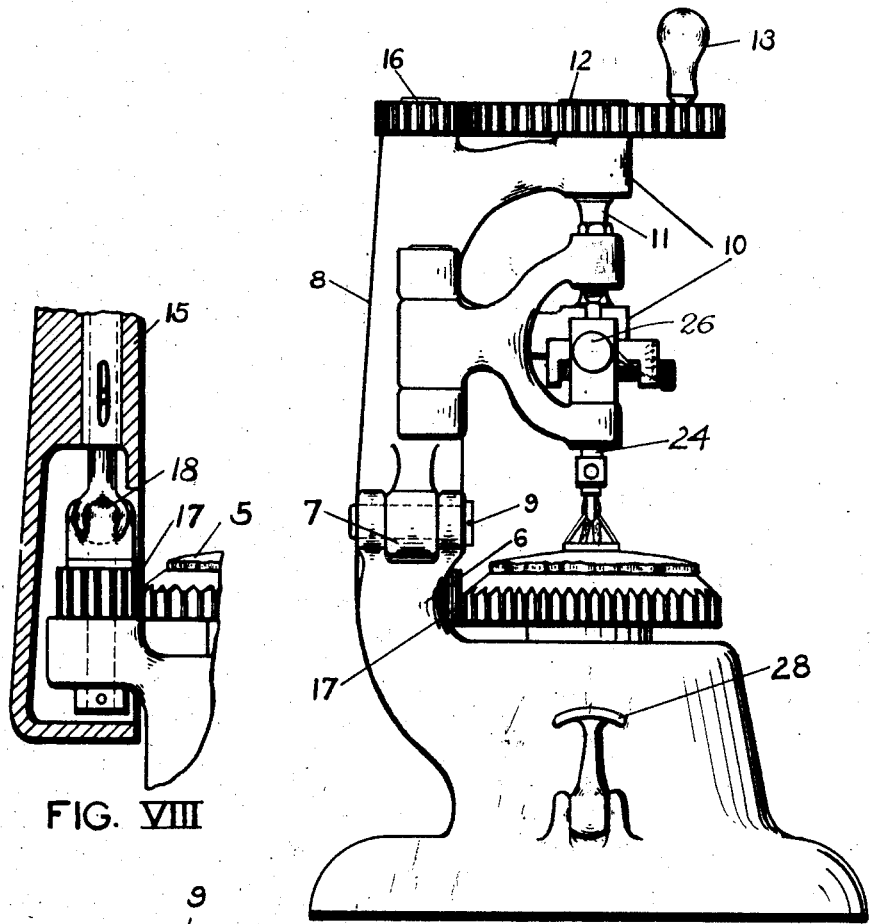
FIG. VIII
FIG. III
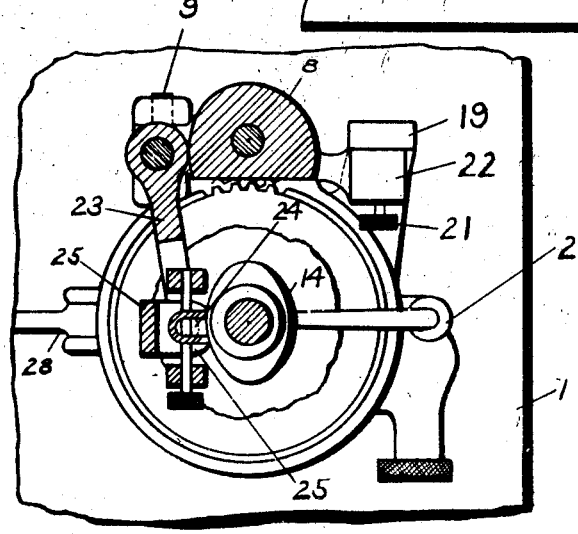
FIG. IV
INVENTOR.
A. E. MAYNARD
BY
H. H. Styll  H. K. Parsons
ATTORNEYS.

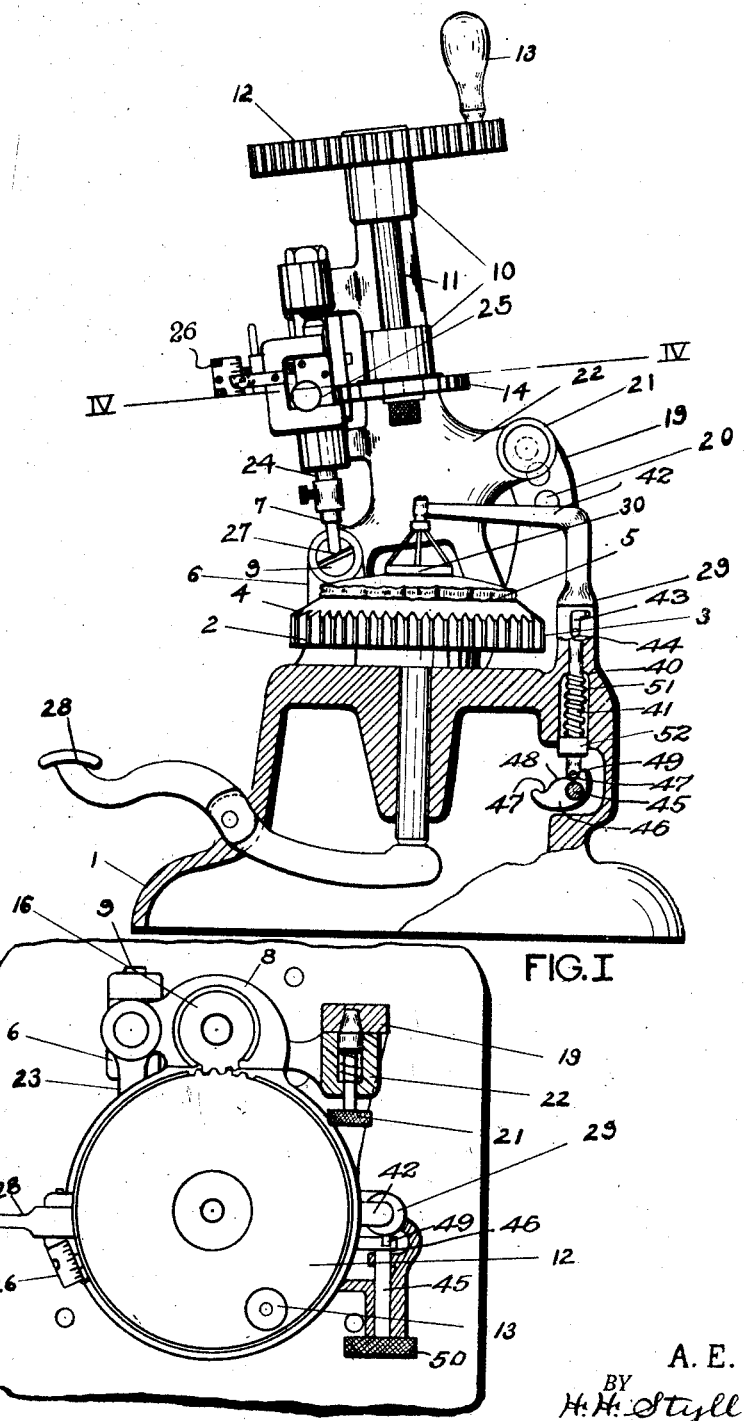

March 2, 1926.
A. E. MAYNARD
1,574,989
LENS CUTTER
Filed Oct. 28, 1919
4 Sheets-Sheet 3
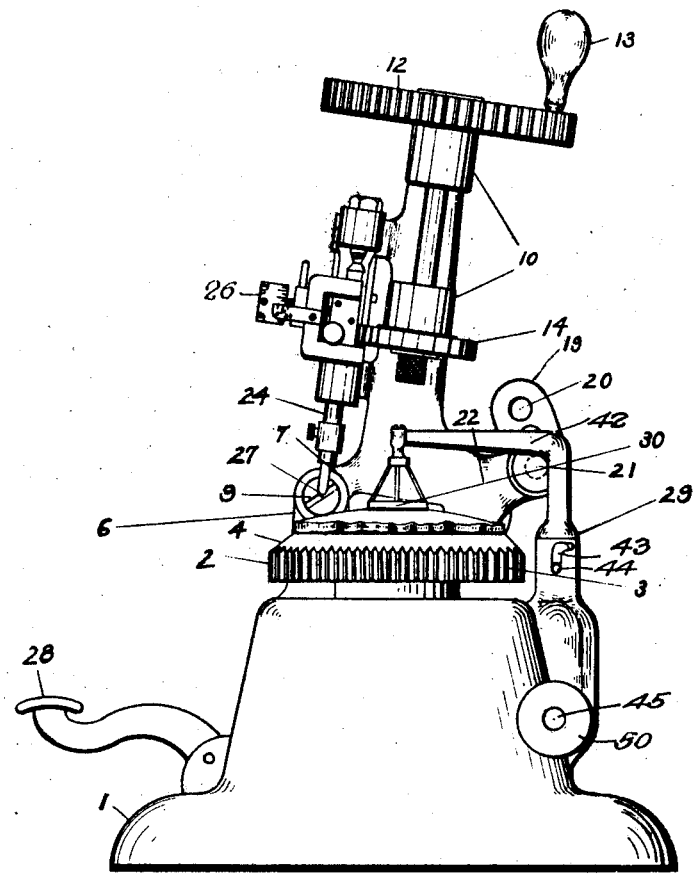
FIG. V
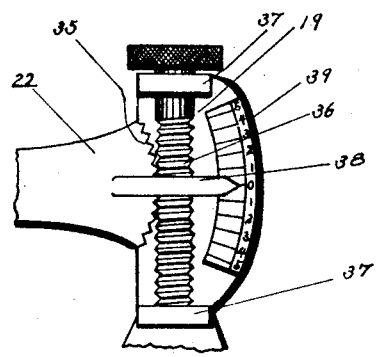
FIG. IX
INVENTOR.
A. E. MAYNARD
BY
ATTORNEYS.

March 2, 1926.  
A. E. MAYNARD  
LENS CUTTER  
Filed Oct. 28, 1919  
1,574,989  
4 Sheets-Sheet 4
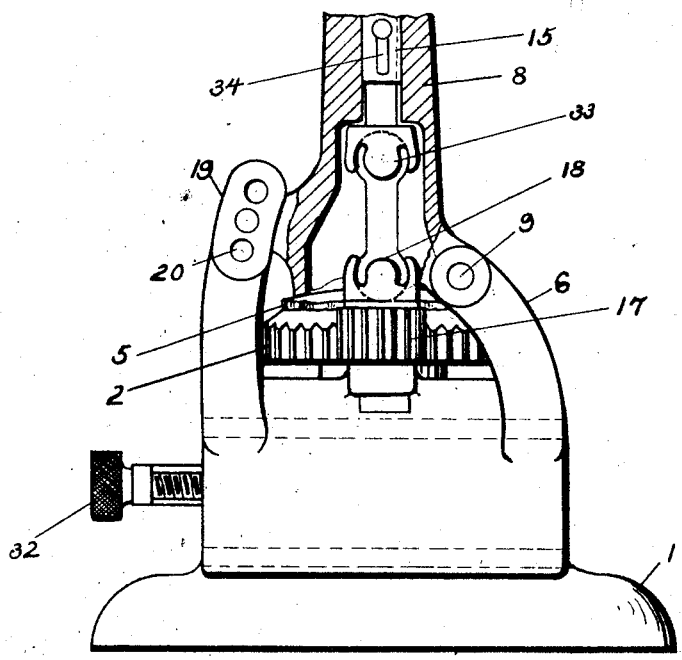
FIG VI
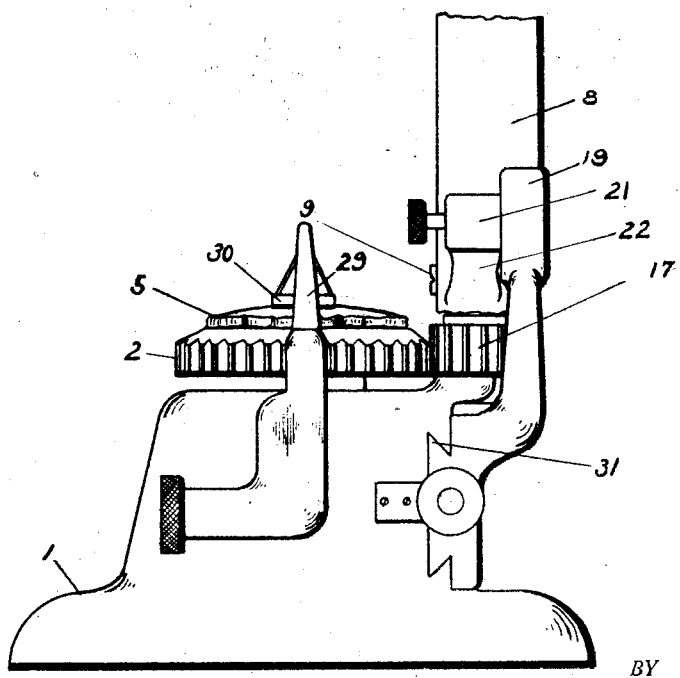
FIG. VII
INVENTOR.
A. E. MAYNARD
BY
ATTORNEYS.

Patented Mar. 2, 1926.

1,574,989

UNITED STATES PATENT OFFICE.

ALBERT E. MAYNARD, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS CUTTER.

Application filed October 28, 1919. Serial No. 333,990.

*To all whom it may concern:*

Be it known that I, ALBERT E. MAYNARD, a citizen of the United States, residing at Southbridge, in the county of Worcester and State of Massachusetts, have invented certain new and useful Improvements in Lens Cutters, of which the following is a specification.

This invention relates to improvements in cutting machines, and has particular reference to a novel and improved construction of machine particularly adapted for the cutting of ophthalmic lenses or similar irregular shapes.

One of the principal objects of the present invention is the provision of an improved construction of machine particularly adapted for cutting on either flat, concave or convex surfaces, which may be readily set to cause the cutting point to be presented in the proper manner to such different surfaces in order that a clean cut may be obtained.

A further object of the present invention is the provision of a device of this character in which maximum rigidity of the parts when in adjusted position is attained, as distinguished from attempts which have been made in the past with swivelled points or the like, with the difficulty of properly rigidly holding them to obtain a clean cut in place of a chattering scratch.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front view of my machine illustrating one adjustment thereof.

Figure II represents a top plan view thereof.

Figure III represents a side elevation.

Figure IV represents a sectional view taken as on the line IV—IV of Figure I.

Figure V represents a view similar to Figure I with the parts set for operation on a concave surface.

Figure VI represents a rear view partially in section of a slightly modified form of my invention.

Figure VII represents a side view thereof.

Figure VIII represents a fragmentary sectional view.

Figure IX illustrates an adjusting mechanism adapted for use in connection with my machine.

In the drawings, the numeral 1 designates the base of my improved cutter provided with the rotary table 2 having the geared edge 3 to facilitate its rotation, and having the supporting pad 4 for the lens 5. Said base 1 has rising therefrom the pivot ear 6, into which fits the lug 7 of the swinging head 8, which is pivotally retained in position as by the bolt or screw 9. This swinging head has forwardly extending bearing arms 10 adapted to receive the rotary spindle 11 bearing at its upper end the operating gear 12 provided with the handle 13, and having removably engaged on its lower end the former 14 for controlling the movement of the cutting point to produce the desired shape of lens. A shaft 15 extends downwardly through the head 8, being provided at its upper end with a pinion 16 meshing with the gear 12, and at its lower end a pinion 17 meshing with the teeth 3 of the rotary table whereby the spindle 11 with its former 14 and the rotary table 2 are connected for synchronous rotation. A universal joint 18 in the spindle 15 allows of swinging movement of the head without disturbing the relative position of the parts and of rotation of the pinion 17 with the shaft 15 irrespective of such tilting movement. Any suitable means may be employed for securing the head 8 in desired tiltingly adjusted position. One of such means is illustrated in the drawings, in which the base 1 has rising therefrom the arcuate member 19 provided with the recesses 20 adapted to be engaged by the fastening pin 21 carried by the arm 22 of the tilting head, the pin being suitably engaged in the desired socket 20 according to the position at which it is desired to fasten the head, and serving to rigidly hold it in such adjusted position.

Hinged or swivelled to the head 8 is the cutter arm 23 provided with the cutter spindle 24 and the former engaging contacts 25 held in adjusted position as respects the cutter 24 through the set screw 26, these parts being of any desired well known type of construction and not requiring further detailed description in this connection.

The table 2 is not only rotatably but also slidably supported by the base 1 and adapted to be raised to bring the lens 5 into engagement with the cutter point 27. This point it will be noted comes substantially into line with the pivot axis so that there will be no noticeable variation of its position on account of the tilting of the head. To raise the table and lens I preferably make use of the rock lever 28 pivoted exteriorly to and projecting into the base and engaging the table, while to retain the lens in position on the table I make use of the spring pressed clamp lever 29 having the swivelled lens clamp 30 which will satisfactorily bear on and hold the lens but rotate with the lens, the pressure of the clamp against the table being sufficient to prevent slipping of the lens so that as the handle 13 is rotated the lens will, through the gearing, be similarly rotated and its successive points presented to the cutting point 27, which is preferably in the form of a diamond, although a steel wheel or other suitable glass cutter may be substituted if desired. In order to provide for adjusting the clamp lever 29, whereby to swing the lens clamp 30 into position for engagement with the lens 5, a portion of the base member is provided with a vertical socket 40 and mounted therein is a stem 41 formed on the lower end of the movable arm 42 and loosely connected to the other end of the arm 42 is the lens clamp 30. The housing surrounding the stem 41 is provided adjacent its upper end with the angular slot 43 and movable within this slot is a pin 44 carried by the stem 41.

Mounted upon a transverse shaft 45 at the lower end of the stem 41 is a cam 46 provided upon its face with spaced recesses 47, which are arranged upon opposite sides of a central raised portion 48. In order to impart a vertical and rotatable movement to the stem 41 a pin 49 is carried by the stem 41, and adapted for engagement with the cam 46. In the position illustrated in Figure I the stem 41 is in a lowered position, the lens clamp 30 being engaged with the lens 5, and in order to disengage the lens clamp from the lens and swing the same out of line with the table movement is imparted to the shaft 45 through the rotatable finger-piece 50, which in turn moves the raised portion 48 of the cam into engagement with the pin 49, imparting an upward movement to the stem 41. As soon as the lens clamp 30 has been entirely disengaged from the lens and the pin 49 engages with the recess 47 opposite the one with which it is engaged, as shown in Figure I, the lens clamp will be entirely free from the lens, whereby continued rotary movement of the shaft 45, the cam, through its engagement with the pin 49, will impart a rotary movement to the stem 41 and swing the arm 42, carrying the lens cam entirely out of line with the table.

Attention is called to the fact that when the stem 41 is raised through the engagement of the cam 46 with the pin 49, the pin 44 will move upwardly in the vertical portion of the slot 43. As soon as the opposing recess 47 engages the pin 49, the pin 44 will be moved into the horizontal portion of the slot 43, retaining the lever 29 in its raised position.

In order to bring the lens clamp into engagement with the lens 5, the shaft 45 is rotated through the medium of the finger-piece 50, whereby the cam 46 will be returned to the position illustrated in Figure I, and during its return movement the pin 44 is returned to the vertical portion of the slot 43, so that the coil spring 51 will move the stem 41 downwardly through the engagement of the spring with the stop member 52 attached to the stem.

From the above it will be apparent that the lens clamp can be quickly and readily arranged in an operative position as illustrated in Figure I and moved to an inoperative position with the lens clamp either arranged above the lens 5 or moved entirely out of line with the table, said operation being carried out through the turning movement of the shaft 45 by means of the finger-piece 50.

From the foregoing description taken in connection with the acompanying drawings it will be seen that I have provided a simple and efficient cutter which may be set either with the cutting point vertical, as for a substantially plain surface, or angled to the left, as for convex surfaces, or to the right, for concave surfaces, and which will thus present the cutter point substantially normal to the surface to be operated upon, whereby most efficient results are secured. In addition I get away from the disadvantages of previous constructions, in that the position of the cutter point itself as respects the former is unvaried by the swinging movement on account of the fact that it projects substantially to the center portion of the head, while the former swings at all times parallel to the cutter spindle so that its relationship and control of the parts is unvaried, while by swinging movement of the head as an entirety the several parts may be made with maximum desired rigidity and the head itself rigidly locked so there are no loose parts to permit of chattering or other than perfect cutting, a very essential feature when the cutter is to be employed in connection with high grade bifocal or similar expensive lenses.

In Figures VI and VII, I have illustrated a slight modification, in that the arm 6 and parts carried thereby, in place of being unitary with the base 1, are connected thereto as by the dove-tail slide connection 31, being capable of transverse adjustment as through the adjusting screw 32, so that when there is any considerable variation in size of lenses to be cut the entire upper member may be transversely shifted to maintain the pivot axis of the member 9 passing through the mean of movements of the cutter for a particular size lens, thus increasing the efficiency of my device. To facilitate this transverse adjustment a second universal joint 33 may be provided in the drive and the vertical drive shaft 15 split as at 34 with the parts slidably but non-rotatably connected.

While for convenience of illustration in the main figures of the drawings I have shown the connection between the tilting head and the base as the recesses 20 for receiving the fastening pin 21 carried by the arm 22 of the head, it will be understood that different forms of connection may be employed in actual use, especially if it is desired to set the machine for finer adjustments than through the use of the recesses illustrated. One form of construction applicable for use in this connection is illustrated in Figure IX, in which the arm 22 has the worm tooth sector 35 meshing with the worm 36 rotatably held by the lugs 37 on the arcuate member 19, whereby rotation of the worm will rock the tilting head, a pointer 38 carried by the head and passing over the graduations 39 on the member 19 serving to indicate the adjustment necessary to bring the cutter at right angles to any particular curve.

I claim:

1. In a lens cutter, the combination with a base bearing a lens support, of a slide carried by the base, a cutter head carried by the slide a former and a cutter on the cutter head having its position controlled by the former, and means for synchronously rotating the former and lens support.

2. In a device of the character described, the combination with a base having a rotary table, of a cutter head pivoted to the base, means for locking the head in pivotally adjusted position, a former carried by the head, and connections for synchronously rotating the table and former.

3. In a lens cutter the combination with a base, of a table rotatably mounted on the base, a cutter head pivoted for vertical swinging movement with respect to the base, a cutter carried by the head, means for controlling the position of the cutter, and means for pressing the table in the direction of the cutter.

4. In a lens cutter, the combination with a base, of a pivot ear rising from the base, a cutter head pivoted to the ear, a cutter carried by the head and extending substantially to the pivot axis, substantially as and for the purpose described.

5. A cutter including a base and a cutter head pivoted thereon, means for securing said parts in desired angularly adjusted relation on the pivot, a lens table carried by one of said parts, a former shape carried by the other, and means for synchronously rotating the lens table and former shape.

6. A lens cutter including a base, a rotatable lens table supported by the base, means carried by the base for clampingly securing a lens in position on the table while permitting rotating of said parts, a cutter head, means for securing the base and head together for pivotal adjustment with respect to each other, a cutter swingingly mounted on the head, means for controlling the swinging movement of the cutter, gearing for simultaneously synchronously rotating the lens table and cutter controlling device, and means for locking the head and cutter in desired angular relation to the base according to the surface to be operated on by the cutter.

7. In a device of the character described, the combination with a base, of a pair of lugs rising from the base, a cutter head pivoted to one of the lugs, and means for adjustably connecting the cutter head to the other of said lugs to secure the head and base in desired angularly adjusted relation.

8. A two part lens cutter comprising a base section having a rotatable table and a cutter head having a rotatable former and laterally swinging cutter controlled thereby, said cutter head and base section being connected for pivotal adjustment with respect to each other.

9. A machine of the character described including a base, a cutter head pivoted to the base, means for angularly adjusting the cutter head with respect to the base and means for indicating the amount of angular adjustment.

10. A lens cutter including a base, a table rotatable on the base, a slide on the base and a cutter head pivoted on the slide whereby the cutter head may be bodily moved with the slide and turned on the pivot on the slide.

11. In a lens cutter, the combination with a base bearing a lens support, of a slide carried by the base, means for adjusting the slide with respect to the base and a cutter head carried by the slide having a rotatable former and a laterally swinging cutter controlled thereby.

In testimony whereof I have affixed my signature.

A. E. MAYNARD.